United States Patent [19]

Crocker

[11] Patent Number: 5,234,497

[45] Date of Patent: Aug. 10, 1993

[54] CEMENTITIOUS FORMULATIONS AND PROCESSES

[75] Inventor: David A. Crocker, Grand Prairie, Tex.

[73] Assignee: Texas Industries, Inc., Dallas, Tex.

[21] Appl. No.: 543,353

[22] Filed: Jun. 25, 1990

[51] Int. Cl.$^5$ .......................... C04D 7/36; C04B 9/11; C04B 11/28; C04B 28/06
[52] U.S. Cl. .................................. 106/695; 106/692; 106/713; 106/819
[58] Field of Search ............... 106/606, 612, 709, 692, 106/695, 819

[56] References Cited

U.S. PATENT DOCUMENTS

| | | | |
|---|---|---|---|
| 3,775,143 | 11/1973 | Mikhailov et al. | 106/695 |
| 3,997,353 | 12/1976 | Chervenka, Jr. et al. | 106/695 |
| 4,033,782 | 7/1977 | Ray et al. | 106/696 |
| 4,082,561 | 4/1978 | Nakagawa et al. | 106/695 |
| 4,350,533 | 9/1982 | Galer et al. | 106/695 |
| 4,357,167 | 11/1982 | Kellet et al. | 106/694 |
| 4,769,077 | 9/1988 | Crocker | 106/816 |
| 4,802,922 | 2/1989 | Smart | 106/695 X |
| 4,875,937 | 10/1989 | Viles | 106/695 |

OTHER PUBLICATIONS

"Design and Control of Concrete Mixtures", Twelfth Edition, Portland Cement Association, pp. 16-24.
"Recommended practice for the use of shrinkage-compensating concrete", Title No. 73-26, American Cement Institute (ACI) Committee 233, ACI Journal, Jun. 1976, pp. 319-339.
"Design and Control of Concrete Mixtures" by Portland Cement Association 13th Ed., 1988. Skokie Ill. pp. 12-18.

Primary Examiner—Mark L. Bell
Assistant Examiner—Michael A. Marcheschi
Attorney, Agent, or Firm—Hubbard, Thurman, Tucker & Harris

[57] ABSTRACT

A fast setting cementitious composition which upon hydration with water forms a paste-like slurry useful in stopping leaks in the walls of cement pipes. The cementitious composition comprises a dry mixture of a hydraulic cement component having a first Portland cement constituent and a second calcium aluminate constituent, an aggregate component and a lime component. Upon hydration with 23 wt. % water, the resulting slurry has an initial Vicat setting time within the range of 1–5 minutes and a final Vicat setting time of no more than 6 minutes. The cement component contains the first and second cement constituents in weight ratios within the range of 3:2–2:3. The lime component is present in an amount within the range of 1–4 wt. %.

In effecting the repair of a water leak, a paste-like slurry is formed from water and the dry cementitious composition. The cementitious paste is supplied to the repair site. Sufficient force is applied against the paste to hold it against the repair site while allowing the cement to set to provide sufficient strength to offset the hydraulic gradient and stop the water leakage.

30 Claims, No Drawings

CEMENTITIOUS FORMULATIONS AND PROCESSES

TECHNICAL FIELD

This invention relates to cementitious compositions and more particularly to fast setting cementitious compositions and processes of using such compositions in stopping water leaks.

BACKGROUND OF THE INVENTION

In the formulation of cementitious compositions it is known in the art to use mixtures of different hydraulic cements, as well as other additives such as accelerators and retarders, in order to provide such characteristics of setting times, strengths and volume changes as are needed to meet the exigencies of various specialty applications. Thus, in U.S. Pat. No. 4,769,077 to Crocker, there is provided a fast setting shrinkage compensating cementitious formulation for use in effecting grouting repairs in road surfaces and the like. This formulation comprises a hydraulic cement mixture of a major amount of a Portland cement constituent and a minor amount of an expansive ettringite forming sulfoalumina cement constituent, along with an aggregate and an accelerator. The accelerator component is a polyvalent metal salt of formic acid, specifically an alkaline earth metal formate such as calcium formate. Specific formulations include mixtures of a Type I, Type IP, or Type III with a Type K, Type M, or Type S with weight ratios within the range of 2-3. The cementitious composition is to affect a grouting repair by mixing the dry formulation with water to provide a cementitious slurry having relatively short initial and final Gilmore setting times, 7 and 14 minutes, respectively, and 14 days curing.

U. S. Pat. No. 4,082,561 to Nakagawa et. al. discloses a two component system which can be used to provide a quick-hardening slurry which can be used to provide stopping of underground water flows. The quick-hardening cement slurry involves a mixture of a calcium aluminate in an amount of 10% to 50%, and preferably 20-30%, on a cement basis together with a Portland cement which can be a normal, rapid hardening Portland cement or a pozzolanic cement. In the Nakagawa procedure, the calcium aluminate quick-hardening agent can be added to the already formulated hydraulic cement slurry to provide setting times ranging from several seconds up to as long as ten minutes.

U.S. Pat. No. 3,997,353 to Chervenka et. al. discloses a cementitious material having a particular ratio of portland cement to calcium aluminate and calcium sulfate which is useful in effecting repairs at such sites as highways and airport runways. The preferred ratios in the Chervenka formulation include 50-60 wt. % portland cement, 30-40 wt. % calcium aluminate, and 5-18, and most preferably 7-15 wt. %, calcium sulfate. When hydrated and allowed to set, the formulation provides high strengths in two hours to one day's time. For example, the hydraulic cement might set in about two hours to provide a compressive strength of 1000 psi to about 1500 psi and a strength of at least 3000 psi within 24 hours.

U.S. Pat. No. 4,357,167 to Kellet et. al. discloses a cement based flowable cavity filling material comprising a mixture of cement, clay and water with the cement mixture comprising Portland cement, a 10-75% mixture of calcium aluminate and calcium sulfate based upon the portland cement and a mixture of an inorganic salt and organic or inorganic setting retarder. Examples of suitable Portland cements for use in the Kellet formulation include ordinary Portland cement, rapid hardening Portland cement and sulfate resistant Portland cement. As noted above, clay can also be employed. Two supply lines can be provided to supply the formulation materials to the cavity with one line supplying a slurry containing the cement mixture and the other line a slurry containing the clay and also the inorganic salt.

SUMMARY OF THE INVENTION

In accordance with the present invention, there is provided a fast setting, cementitious composition which upon hydration with water can be molded into a paste-like slurry useful in stopping leaks in the walls of cement pipes or other structures. The cementitious composition comprises a dry mixture of a hydraulic cement component having a first Portland cement constituent and a second calcium aluminate cement constituent. The dry mixture also contains an aggregate component and a lime component. Upon being mixed with water in an amount within the range of 21-23 wt. % of the dry mixture, the resulting slurry has an initial Vicat setting time within the range of 1-5 minutes and a final Vicat setting time of no more than 6 minutes. Preferably, under the conditions stated, the resulting slurry has an initial Vicat setting time within the range of 2-4 minutes and a final Vicat setting time of no more than 5 minutes.

Preferably, the cement component contains the first and second cement constituents in weight ratios within the range of 3:2-2:3 and more preferably, within the range of 5:4-4:5. The lime component is present in an amount within the range of 1-4 wt. %, based upon the hydraulic cement component, i.e., the mixture of the two cements. The ratio of the hydraulic cement component to the aggregate component preferably is within the range of 1:1-2:1 and more preferably, the ratio is about 3:2. The aggregate component preferably is of small size, such as sand having an average particle size of less than ¼ inch.

In further aspect of the invention, the Portland cement constituent comprises an expansive ettringite-forming sulfo alumina cement and more preferably, a cement selected from the group consisting of Type K, Type M, and Type S cements and mixtures thereof. A preferred formulation includes Type K cement in a weight ratio to the calcium aluminate cement within the range of 5:4-4:5. In another aspect of the invention, the first cement constituent is Type IP cement present in an amount to provide a weight ratio to the calcium aluminate cement within the range of 4:5-5:4.

In a further aspect of the present invention there is provided a process for employing a cementitious composition as described in effecting the repair of a site in the surface of a wall through which water is leaking under a hydrostatic gradient extending through the wall to the surface repair site. A paste-like slurry is formed from water and a cementitious composition of hydraulic cement and aggregate and lime components as described above. The water is added in an amount between a range of 19-25 wt. % of the cementitious composition which is effective to provide an initial Vicat setting time within the range of 1-5 minutes and a final Vicat setting time of no more than six minutes. The cementitious paste is supplied to the repair site. Sufficient force is applied against the relatively stiff paste to hold it against the repair site while allowing the cement to set to provide sufficient strength to offset the hydraulic gradient and stop the water leakage.

DETAILED DESCRIPTION OF THE INVENTION

The present invention provides a cementitious composition in the form of a dry mixture which can be packaged in the dry form to provide a readily flowable material which can be mixed with a defined amount of water to form a relatively stiff cementitious slurry or paste in a plastic form. The stiff paste can be easily manipulated and molded by hand to provide a mass for insertion into a cavity at a repair site in a concrete pipe wall or the like through which water is flowing under hydrostatic head. The cement or paste slurry has a rapid setting time such that the plastic mass can be held in place against the force of the water for a few minutes until it sets sufficiently to develop adequate strength to offset the applied hydraulic gradient and stop the leakage of water. The rapid setting time and strength of the cement formulations of the present inventions are especially significant in order to minimize fatigue of the operator in manual application of the product to stop water leaks.

In accordance with the invention, the fast setting cementitious composition comprises a dry flowable mixture of a hydraulic cement component, an aggregate component, and a lime component. The cement component comprises a mixture of a first Portland cement constituent and a second calcium aluminate constituent. The Portland cement constituent can be readily characterized as having a relatively low alumina content, less than 10 wt. %. Within defined limits it may be a conventional Portland cement of the high early strength type, or of the pozzolan containing type, although preferably it is an expansive ettringite-forming cement.

Portland cements are characterized by type in accordance with standards developed by the American Portland Cement Association and the standards and designations applied there are used in characterizing portland cements herein. For a description of such standards, reference is made to *Design and Control of Mixture*, Twelfth Edition, Portland Cement Association, Chapter 2. "Portland Cements", pp. 16–24.

Calcium aluminate cements, also referred to as high alumina cements, have a high alumina content, usually at least 30 wt. %, as contrasted with Portland type cements which contain less than 10 wt. %, usually less than 5 wt. % alumina. The alumina is supplied by the inclusion of bauxite, and typically, the calcium alumina cements are formed by sintering of Clinkers limestone and bauxite with small amounts of silica and other materials such as titanium oxide and iron oxide. For a further description of calcium aluminate cements, reference is made to U.S. Pat. No. 4,033,782 to Ray et. al., the entire disclosure of which is incorporated herein by reference.

Conventional cements which can be used in the present invention if they are present within defined limits and are of the high early strength type are composed of four principal compounds. These compounds (with the conventional cement chemistry abbreviated notations given in the parentheses) are tricalcium silicate, $3CaO \cdot SiO_2$ ($C_3S$), dicalcium silicate $2CaO \cdot SiO_2$ ($C_2S$), tricalcium aluminate, $3CaO \cdot Al_2O_3$ ($Ca_3A$), and tetracalcium aluminoferrite, $4CaO \cdot Al_2O_3 \cdot Fe_2O_3$ ($Ca_4AF$). The chemical composition of these cements, in terms of wt. % of oxides is typically about ⅔ CaO, about ¼–1/5 silica, about 3–7% alumina, and usually lesser amount of $Fe_2O_3$, MgO and $SO_3$. Thus, these portland cement compositions typically contain more than 60% CaO and less than 3% aluminum and 1.5% sulfur.

Another type of Portland cement which can be employed in the formulation of the present invention is pozzolanic cement which is portland cement of the type described above blended with a pozzolan content. Preferably the pozzolan is present in an amount within the range of 15–40 wt. % of the portland cement constituent. A preferred pozzolanic cement is Type IP cement.

The preferred Portland type cement employed in the hydraulic cement component is selected from a special class of modified cements, normally referred to an expansive or shrinkage compensating cements, which are ettringite forming cements. These cements are typically substantially higher in aluminum and sulfur content than are the conventional Portland cements. In addition, because of the increased amounts of alumina and sulfates present in these cements for the formation of ettringite, the calcium oxide content present in the form of silicates, aluminates and aluminoferrites is less than 62 wt. % and usually less than 60 wt. %. As described in Title No. 73-26 "Recommended Practice for the Use of Shrinkage-Compensating Concrete" by the American Cement Institute (ACI) Committee 233, ACI Journal, June 1976, pages 319–339,"such expansive cements, identified as Type K, Type M, and Type S, are based upon Portland cements with added sulfoaluminate constituents which provide for the formation of ettringite. Type K cement contains Portland cement, calcium sulfate and calcium sulfoaluminate; Type M, Portland cement, calcium sulfate and calcium aluminate cement; and Type S, a high tricalcium aluminate portland cement and calcium sulfate. For a further description of such ettringite forming expansive cements, reference is made to Title No. 73-26, above, and also to Texas Industries (TXI) publication, "A guide for testing, handling and placing Type K Cement concrete a shrinkage compensating cement," the entire disclosures of which are incorporated herein by reference. As further disclosed in Title 73-26 and the TXI publication, the shrinkage compensating cement formulations undergo a fairly rapid expansion after hydration followed by gradual shrinkage during the air drying period. The conventional Portland cements, on the other hand, initially remain relatively constant in volume and then shrink in volume until ultimately achieving a substantial reduction in volume.

The relative volume changes for shrinkage compensating cements and for conventional portland cements are shown in Title No. 73-26 and the TXI publication. As shown in FIG. 1 of the TXI publication and in FIG. 2.5.3 of Title No. 73-26, for internally restrained concrete samples, the high ettringite forming cement undergoes an initial volumetric expansion during the initial moist cure period and thereafter undergoes a gradual decrease in volume during the subsequent air drying. The result is that the expansive cement returns to or near its original volume at the conclusion of the curing and drying period.

While shrinkage compensating cements are advantageously used in reinforced concrete applications, the initial expansive action of such cements indicates that they should not be used in circumstances where rigid exterior restraints are present. Thus, as disclosed in Title No. 73-26, rigid exterior restraints are not recommended since they prevent expansion of the concrete with the result that subsequent shrinkage will result in negative strains and concrete tension. For example, where framework is employed, it should be sufficiently flexible to accommodate expansion of the concrete. In fact, Title No. 73-26 suggests that a resilient type of constraint such as provided by internal reinforcement is necessary for proper shrinkage compensation and that other types of restraint, including structural elements or even subgrade friction, should be avoided.

Notwithstanding the prior art indication that shrinkage compensating cements should be used only with internal reinforcement and without rigid exterior restraints, the aforementioned U.S. Pat. No. 4,769,077 to Crocker involves the use of a shrinkage compensation constituent in combination with a conventional Portland cement constituent to provide a closely shrinkage/expansive balanced grouting composition which is generally suitable for use where rigid exterior restraints are present as in patching holes in concrete and the like.

In the preferred embodiment of the present invention, an expansive shrinkage compensating cement of the type used in the formulation of the aforementioned patent to Crocker is employed in combination with a high alumina cement constituent to provide a fast setting cement slurry or paste which can be applied to a cavity through which water is leaking under a hydraulic pressure gradient. Mechanical interlocking can be provided by the texture of the peripheral surface of the cavity being patched. The hydrated cementitious composition of this embodiment of the invention initially expands as it sets up to provide resistance against the force of the leaking water. It is shrinkage compensating, and after reaching a permanent set is resistant to deterioration under repeated cycles of freezing and thawing. This embodiment of the invention will be described in detail with reference to the preferred Type K cements. The standards for Type K cements are set forth in ASTM C-845. However, it will be recognized that other ettringite-forming cements, specifically Type M and Type S cements, may also be used.

Another cement constituent which can be used in the invention is Type III Portland cement having standards as given in ASTM C-150. Type III is a fast setting, high early strength cement which has faster setting and strength gain characteristics than Type K cement. As noted previously, Type IP cement, a Portland-pozzolanic cement blended in accordance with ASTM C-595, may also be used as the Portland cement constituent of the cementitious mixture.

Another component of the cementitious composition is an aggregate which is added for conventional purposes, that is, to extend the cementitious composition and to increase the strength of the set product where appropriate via water reduction. The aggregate preferably is a relatively fine material such as specified in accordance with ASTM C 33, or ASTM C 144, although coarser aggregates can also be employed. The preferred aggregate is sand having an average particle size of less than ⅛ inch.

The lime component acts to influence the setting time and provide a product which acts rapidly and has a high early strength so that it need only be held in place for a few minutes as described previously, before it can be released to stop the leakage of water. While Applicant's invention is not to be limited by theory, it is believed that the lime acts as a "trigger" with the generation of heat upon hydration of the cementitious mixture to impart an early strength gain. The lime used in the present invention normally will take the form of air-slaked lime containing calcium hydroxide and calcium carbonate although in addition to calcium oxide, unslaked lime may also be used. A suitable lime component for use in the invention is hydrated lime available from Austin White Lime Co., Austin, TX and having an average available calcium hydroxide content of 94.5 wt. % and a calcium carbonate content of 2.9 wt. %.

As is known in the art, mixtures of Portland and calcium aluminate cements provide shorter setting times than those attained with either cement by itself. The accelerated setting times are accompanied by substantial loss of strength. The formulation of the present invention incorporating lime as an accelerator or trigger provides extremely short initial and final setting times while retaining sufficient early strength to offset the hydraulic gradient of the leaking water. Ultimate strength is also retained to provide good durability through frequent cycles of freezing and thawing. As indicated by the experimental data set forth below, the use of lime in the formulation of the present invention offers substantial improvement over calcium formate, which is conventionally used as an accelerator in cementitious compositions.

The results of experimental work respecting the present invention are set forth below. Initial and final setting times were determined in accordance with ASTM designation C 191-82 "Standard Testing Method for Time of Setting of Hydraulic Cement by Vicat Needle" and are referred to herein as Vicat setting times.

The experimental work was carried out employing mixtures of calcium aluminate cement with Type K, Type 3, and Type IP Portland type cements as described above. The ratios of the calcium aluminate to Portland type cement constituents ranged from 3:2 to 2:3. The amount of water used ranged from 21 to 23 wt. % water based upon the dry cement formulations, including the sand and where present, the lime. In the following Tables, the percents of the cement constituents are given relative to the total cement component. The sand is given as a percent of the total cement mixture. Thus, by way of example, in run (#1) of Table I, the total cement component was 600 g., 40% calcium aluminiate cement, or 240 g., and 60% Type K cement or 360 g. Sand was 40% of the total formulation, or 400 g.

A first set of experiments was carried out employing a dry cement sand mixture without the incorporation of lime. The dry cement formulation, the amount of water added, and the initial and final Vicant setting times for this first set of experiments are set forth in Table I.

TABLE I

| Description | % H$_2$O | Init. Vicat min./sec. | Final Vicat min./sec. |
|---|---|---|---|
| 1)<br>40% CA<br>60% Type K<br>40% Sand | 23.0 | 10:30 | 14:00+ |
| 2)<br>50% CA<br>50% Type K<br>40% Sand | 23.0 | 5:30 | 9:00 |
| 3)<br>60% CA<br>40% Type K<br>40% Sand | 23.0 | 4:00 | 11:00+ |
| 4)<br>55% CA<br>45% Type K | 23.0 | 3:30 | 7:15 |

TABLE I-continued

| Description | % H₂O | Init. Vicat min./sec. | Final Vicat min./sec. |
|---|---|---|---|
| 40% Sand | | | |
| 5) | 21.0 | 4:30 | 7:30 |
| 40% CA | | | |
| 60% Type III | | | |
| 40% Sand | | | |
| 6) | 21.0 | 3:15 | 6:15 |
| 50% CA | | | |
| 50% Type III | | | |
| 40% Sand | | | |
| 7) | 21.0 | 2:30 | 9:00+ |
| 60% CA | | | |
| 40% Type III | | | |
| 40% Sand | | | |
| 8) | 21.0 | 3:00 | 7:45 |
| 50% CA | | | |
| 50% Type IP | | | |
| 40% Sand | | | |

In each of the examples set forth in Table I, the amount of water added (21–23%) provided a workable putty-like paste which could be worked by hand and placed in a cavity to stop a water leak. Formulation 1) was slightly thin, although still having a plastic putty-like consistency. The remaining samples were somewhat thicker in consistency. Formulations (1) through (5), (7) and (8) failed to develop heat after being mixed with the water. Formulation (6) developed a slight amount of heat upon hydration. As also indicated by the experimental work of Table I, the shortest setting times were observed for mixtures where the Portland cement and calcium aluminate cement constituents were used in approximately equal amounts. For the mixture of Type K and calcium aluminate cement, the shortest final setting time was found in the mixture containing 55% calcium aluminate and 45% Type K cements. For the mixtures of calcium aluminate with Type 3 cement and calcium aluminate with Type IP cements, the shortest final setting times were observed for 50:50 % mixtures.

The amounts of water used in the experimental work reported in Table I also reflect the considered optimum water concentrations for the various Portland type cement constituents used in formulating the cementitious compositions. In general, the expansive cements such as Type K require slightly more water to arrive at the optimum slurry in terms of setting times than do the Type III and pozzolanic cements. The optimum water concentration for the desired low setting times range from about 21 wt. % (for the Type III and Type IP cements) to 23 wt. % (for the Type K cement). A water concentration of about 22 wt. % can be used for the various cements and will produce optimum or near optimum setting times.

In further experimental work respecting the invention, mixtures of calcium aluminate, Type K, Type III, and Type IP cements were used with small amounts of lime added. The results of this experimental work are set forth in Table II. The amount of lime in the mixture is stated as a percent of the cement, that is the cement mixture without the sand. In the experimental work reported in Table II, runs (9), (10), and (11) correspond respectively to runs (4), (6), and (8) in Table I, but contain, in addition, a lime component as indicated.

TABLE II

| Description | % H₂O | Init. Vicat min./sec. | Final Vicat min./sec. |
|---|---|---|---|
| 9) | 23.0 | 3:30 | 5:15 |

TABLE II-continued

| Description | % H₂O | Init. Vicat min./sec. | Final Vicat min./sec. |
|---|---|---|---|
| 55% CA | | | |
| 45% Type K | | | |
| 3% Lime | | | |
| 37% Sand | | | |
| 10) | 21.0 | 2:45 | 4:00 |
| 50% CA | | | |
| 50% Type III | | | |
| 1% Lime | | | |
| 39% Sand | | | |
| 11) | 21.0 | 2:15 | 4:00 |
| 50% CA | | | |
| 50% Type IP | | | |
| 1% Lime | | | |
| 39% Sand | | | |

As can be seen by the data presented in Tables I and II, the addition of a small amount of lime either had no effect on the initial Vicat setting time, run (9) compared with run (4), or resulted in a decrease in Vicat setting times of from 30–45 seconds, run (10) compared with run (6) and run (11) compared with run (8). However, the final setting times were decreased substantially, from 2 minutes in the case of run (9) as compared with run to almost 4 minutes in the case of run (11) compared with run (8).

Table III sets forth the results of experimental work in which a conventional accelerator, calcium formate, was used instead of lime in certain calcium aluminate Type K cement mixtures. In the experimental work set forth in Table III, runs (12) and (13) can be compared with runs (4) and (9) of Tables I and II, respectively, and run (14) can be compared with runs (1) and (2) of Table I.

TABLE III

| Description | % H₂O | Init. Vicat min./sec. | Final Vicat min./sec. |
|---|---|---|---|
| 12) | 19.0 | 10:00 | — |
| 55% CA | | | |
| 45% Type K | | | |
| 6% Calcium Formate | | | |
| 34% Sand | | | |
| 13) | 22.0 | 7:45 | 12:00+ |
| 55% CA | | | |
| 45% Type K | | | |
| 1% Calcium Formate | | | |
| 39% Sand | | | |
| 14) | 19.0 | 7:30 | — |
| 45% CA | | | |
| 55% Type K | | | |
| 6% Calcium Formate | | | |
| 34% Sand | | | |

As can be seen from the experimental work presented in Table III, the conventional calcium formate accelerator was ineffective in imparting the requisite setting times to the cementitious slurries.

Table IV sets forth strengths in compression and tension as a function of time for formulations (9) and (10) of Table II. In Table IV, the values are reported in pounds per square inch in compression and tension as determined in accordance with ASTM C-109 and ASTM C-190, respectively.

TABLE IV

|  | Formulation #9 | | Formulation #10 | |
| --- | --- | --- | --- | --- |
|  | Comp. psi | Tens. psi | Comp. psi | Tens. psi |
| 20 minutes | 750 |  | 560 |  |
| 2 hr. | 1720 |  | 870 |  |
| 24 hr. | 3050 |  | 2570 |  |
| 3 day | 3970 | 190 | 3780 | 230 |
| 7 day | 4700 | 210 | 4610 | 270 |
| 28 day | 6150 | 490 | 6370 | 370 |

Expansion data for formulations (9) and (10) under dry cure and wet cure regimens in accordance with ASTM C 806 are set forth in Tables V and VI, respectively. In the dry cure tests reported in Table V, the specimens were cured in a moist box in accordance with ASTM C 511 for 24 hours. The remainder of the test time was under dry curing conditions. For the wet cure data presented in Table VI, the specimens were made in molds and remained in the molds under ambient conditions for 20 minutes. The specimens were then placed in lime-saturated water maintained at 73° F. for the duration of the testing.

TABLE V

|  | Formulation #9 | Formulation #10 |
| --- | --- | --- |
| Restrained |  |  |
| 1 day | −0.009 | −0.007 |
| 2 day | −0.008 | −0.010 |
| 3 day | −0.015 | −0.017 |
| 7 day | −0.019 | −0.019 |
| 14 day | −0.036 | −0.035 |
| 21 day | −0.041 | −0.034 |
| 28 day | −0.051 | −0.040 |
| Unrestrained |  |  |
| 1 day | −0.022 | −0.023 |
| 2 day | −0.034 | −0.034 |
| 3 day | −0.036 | −0.041 |
| 7 day | −0.039 | −0.045 |
| 14 day | −0.065 | −0.064 |
| 21 day | −0.072 | −0.082 |
| 28 day | −0.092 | −0.098 |

TABLE VI

|  | Formulation #9 | Formulation #10 |
| --- | --- | --- |
| Restrained |  |  |
| 20 min. | 0.000 | 0.007 |
| 1 day | −0.003 | −0.006 |
| 2 day | 0.025 | −0.009 |
| 3 day | 0.026 | 0.021 |
| 7 day | 0.033 | 0.025 |
| 14 day | 0.042 | 0.041 |
| 21 day | 0.049 | 0.043 |
| 28 day | 0.081 | 0.053 |
| Unrestrained |  |  |
| 20 min. | 0.004 | 0.002 |
| 1 day | 0.002 | −0.011 |
| 2 day | 0.034 | −0.022 |
| 3 day | 0.045 | 0.011 |
| 7 day | 0.041 | 0.025 |
| 14 day | 0.067 | 0.056 |
| 21 day | 0.086 | 0.061 |
| 28 day | 0.113 | 0.075 |

From an examination of the data presented in Table VI, it will be recognized that both of the formulations tested showed good shrinkage/expansion characteristics under wet cure conditions. This is, of course, particularly significant in the application of the formulations of the present invention in stopping water leaks. The data presented in Table VI also shows that the formulation employing the expansive Type K cement shows somewhat better shrinkage/expansion characteristics than observed for the formulation employing the high early strength Type III cement. In fact, in the unrestrained state, the formulation containing the expansive cement showed a positive expansion throughout the test cycle and also showed substantially more expansion throughout the test cycle than the formulation containing the Type 3 cement. Similar relative results for the formulation containing the Type K cement as compared with that containing the Type 3 cement are shown in the dry cure results presented in Table V.

In the process of effecting repair of a water leak, a dry cementitious composition as described above is mixed with water in an amount to provide initial and final Vicat setting times as described previously, that is, an initial setting time within the range of 1-5 minutes, preferably 2-4 minutes, and a final setting time of no more than 6 minutes, and preferably, no more than 5 minutes. The amount of water added to provide optimum results may vary somewhat from formulation to formulation as described above, but as a practical matter, the water should be added in an amount within the range of 19-25 wt. % of the dry formulation.

Immediately upon formation of the paste-like slurry, it can be molded by hand to the desired configuration conforming to the shape of the repair site and then applied to the repair site through which the water is leaking. It usually will be desirable to formulate the repair material into generally conical shape with the apex of the cone shaped mass placed first against the repair site. Once in place, the operator can simply manually apply force against the paste to hold it against the repair site until it sets sufficiently to provide a strength adequate to off-set the hydraulic gradient under which the water leak is flowing.

Having described specific embodiments of the present invention, it will be understood that modifications thereof may be suggested to those skilled in the art, and it is intended to cover all such modifications as fall within the scope of the appended claims.

I claim:

1. A cementitious composition comprising:
   (a) a dry mixture of (i) a hydraulic cement component having a first Portland cement constituent and a second calcium aluminate cement constituent, the weight ratio of said first cement constituent to said second cement constituent being within the range of 3:2–2:3; (ii) an aggregate component; and (iii) a lime component; and
   (b) said dry mixture having an initial Vicat setting time within the range of 1-5 minutes and a final Vicat setting time of no more than 6 minutes when said dry mixture is mixed with water of an amount of 21-23 wt. % of said dry mixture.

2. The composition of claim 1 wherein said initial Vicat setting time is within the range of 2-4 minutes and said final Vicat setting time is no more than about 5 minutes.

3. The composition of claim 1 wherein the weight ratio of said first cement constituent to said second cement constituent is within the range of 5:4–4:5.

4. The composition of claim 1 wherein said lime component is present in an amount within the range of 1-5 wt. % of said cement component.

5. The composition of claim 4 wherein said aggregate component has an average particle size of less than ⅛ inch.

6. The composition of claim 5 wherein the ratio of said hydraulic cement component to said aggregate component is within the range of about 1:1–2:1.

7. The composition of claim 6 wherein said ratio of cement component to said aggregate component is about 3/2.

8. The composition of claim 1 wherein said Portland cement constituent comprises an expansive ettringite-forming sulfo-alumina cement.

9. The composition of claim 1 wherein said first Portland cement constituent contains pozzolan.

10. The composition of claim 9 wherein the pozzolan content of said first cement constituent is within the range of 15–40 wt. % of said cement constituent.

11. The composition of claim 10 wherein said first cement constituent is Type IP cement.

12. The composition of claim 11 wherein the weight ratio of said Type IP cement to said calcium aluminate cement is within the range of 4:5–5:4.

13. The composition of claim 1 further comprising water in an amount within the range of 19–25 wt. % of said dry mixture to produce a paste-like slurry.

14. A cementitious composition comprising a dry mixture of:
(a) a hydraulic cement component having (i) a first Portland cement constituent selected from the group consisting of an expansive ettringite-forming sulfo-alumina containing cement having a sulfur content greater than 1.5 wt. % and an alumina content less than 10 wt. %, and a pozzolan containing cement having a pozzolan content within the range of 15–40 wt. % of said cement, and (ii) a second calcium aluminate cement constituent having an alumina content of at least 30 wt. %, the weight ratio of said first cement constituent to said second cement constituent being within the range of 3:2 to 2:3; and
(b) an aggregate component present in an amount to provide a ratio of said hydraulic cement component to said aggregate component within the range of about 1:1–2:1;
(c) a lime component present in an amount within the range of 1–4 wt. % of said composition; and
(d) said dry mixture having an initial Vicat setting time within the range of 1–5 times and a final Vicat setting time of no more than 6 minutes when mixed with water of an amount of 21–23 wt. % of said dry mixture.

15. The composition of claim 14 wherein said initial Vicat setting time is within the range of 2–4 minutes and said final Vicat setting time is no more than 5 minutes.

16. The composition of claim 14 further comprising water in an amount within the range of 19–25 wt. % of said dry mixture to produce a paste-like slurry.

17. The composition of claim 14 wherein the weight ratio of said first Portland cement constituent to said second calcium aluminate cement constituent is within the range of 5:4–4:5.

18. The composition of claim 14 wherein said first Portland cement constituent comprises pozzolan containing cement.

19. The composition of claim 18 wherein said pozzolan containing cement is Type IP cement.

20. The composition of claim 19 wherein one weight ratio of said Type IP cement to said calcium aluminate cement is within the range of 4:5–5:4.

21. The composition of claim 14 wherein said Portland cement constituent comprises an expansive ettringite-forming sulfo-alumina cement.

22. The composition of claim 21 wherein said expansive ettringite-forming cement is selected from the group consisting of Type K, Type M, and Type S cements and mixtures thereof.

23. The composition of claim 22 wherein said expansive ettringite-forming cement component comprises Type K cement.

24. The composition of claim 23 wherein the weight ratio of said Type K cement to said calcium aluminate cement is within the ratio of 5:4–4:5.

25. The composition of claim 24 wherein the ratio of said h cement component to said aggregate component is of about 1:1–2:1.

26. The composition of claim 25 wherein said ratio of cement component to said aggregate component is about 3/2.

27. The composition of claim 26 wherein said aggregate component has an average particle size of less than ¼ inch.

28. A cementitious composition comprising:
(a) a dry mixture of (i) a hydraulic cement component having a first Portland cement constituent selected from the group consisting of Type K, Type M, and Type S cements and mixtures thereof and a second calcium aluminate cement constituent, the weight ratio of said first cement constituent to said second cement constituent being within the range of 3:2 to 2:3; (ii) an aggregate component; and (iii) a lime component; and
(b) said dry mixture having an initial Vicat setting time within the range of 1–5 minutes and a final Vicat setting time of no more than 6 minutes when said dry mixture is mixed with water of an amount of 21–23 wt. % of said dry mixture.

29. The composition of claim 22 wherein said first cement component comprises Type K cement.

30. The composition of claim 28 wherein the weight ratio of said Type K cement to said calcium aluminate cement is within the ratio of 5:4–4:5.

* * * * *